United States Patent
Wu et al.

(10) Patent No.: US 12,411,239 B2
(45) Date of Patent: Sep. 9, 2025

(54) TIME-OF-FLIGHT RANGING DEVICE AND TIME-OF-FLIGHT RANGING METHOD

(71) Applicant: Egis Technology Inc., Hsinchu (TW)

(72) Inventors: Tung-Yu Wu, Hsinchu (TW); Tang-Hung Po, Hsinchu (TW); Sheng Wan, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 962 days.

(21) Appl. No.: 17/522,927

(22) Filed: Nov. 10, 2021

(65) Prior Publication Data

US 2022/0179078 A1    Jun. 9, 2022

Related U.S. Application Data

(60) Provisional application No. 63/121,243, filed on Dec. 4, 2020.

(30) Foreign Application Priority Data

Sep. 29, 2021    (CN) ............................ 202111154878.7

(51) Int. Cl.
  *G01S 17/00*    (2020.01)
  *G01S 7/48*    (2006.01)
  (Continued)

(52) U.S. Cl.
  CPC ............ *G01S 17/46* (2013.01); *G01S 7/4808* (2013.01); *G01S 7/4863* (2013.01); *G01S 7/4865* (2013.01)

(58) Field of Classification Search
  USPC ....................................................... 356/5.01
  See application file for complete search history.

(56) References Cited

U.S. PATENT DOCUMENTS 9,874,629 B2 * 1/2018 Kostamovaara .......... G01C 3/08
10,801,886 B2 * 10/2020 Mandai ...................... G01J 1/44
(Continued)

FOREIGN PATENT DOCUMENTS

CN    105093206    11/2015
CN    105164550    12/2015
(Continued)

OTHER PUBLICATIONS

S. W. Hutchings et al., "A Reconfigurable 3-D-Stacked SPAD Imager With In-Pixel Histogramming for Flash LIDAR or High-Speed Time-of-Flight Imaging," in IEEE Journal of Solid-State Circuits, vol. 54, No. 11, pp. 2947-2956, Nov. 2019 (Year: 2019).*
(Continued)

*Primary Examiner* — James R Hulka
(74) *Attorney, Agent, or Firm* — JCIPRNET (57) ABSTRACT

A time-of-flight ranging device and a time-of-flight ranging method are provided. The time-of-flight ranging device includes a light source, a sensing array, and a time-to-digital converter. The light source emits a laser pulse signal towards a sensing target. The sensing array includes a plurality of sensing units. The sensing array is configured to sense reflected pulse light generated when the sensing target reflects the laser pulse signal. The time-to-digital converter is coupled to the sensing array. The time-to-digital converter performs an integration operation on a plurality of sensing results of the sensing units during a plurality of consecutive integration periods to generate histogram data. At least part of the integration periods have different time lengths, such that at least part of a plurality of bins in the histogram data have different bin widths.

14 Claims, 7 Drawing Sheets

(51) Int. Cl.
  *G01S 7/4863* (2020.01)
  *G01S 7/4865* (2020.01)
  *G01S 17/46* (2006.01)

(56) References Cited

U.S. PATENT DOCUMENTS

| | | | |
|---|---|---|---|
| 11,172,186 B2* | 11/2021 | Van Nieuwenhove | ................ H04N 13/128 |
| 11,233,966 B1* | 1/2022 | Niclass | ................ H04N 17/002 |
| 11,639,990 B2* | 5/2023 | Henderson | ............ G01S 7/4863 356/4.01 |
| 11,650,292 B2* | 5/2023 | Zhang | ................ H01S 5/02257 356/4.01 |
| 11,709,266 B2* | 7/2023 | Meinherz | ................ G01S 7/497 356/5.01 |
| 2005/0223371 A1* | 10/2005 | Nefian | ................ G06F 11/3452 714/E11.197 |
| 2012/0257187 A1 | 10/2012 | Stutz et al. | |
| 2013/0129022 A1* | 5/2013 | Wei | ................ H04B 17/26 375/343 |
| 2015/0092847 A1* | 4/2015 | Su | ................ H04N 19/33 375/240.12 |
| 2015/0177369 A1 | 6/2015 | Kostamovaara | |
| 2015/0379175 A1* | 12/2015 | Parnami | ................ G06F 30/30 716/134 |
| 2018/0164415 A1 | 6/2018 | Buckley et al. | |
| 2018/0209846 A1 | 7/2018 | Mandai et al. | |
| 2018/0211152 A1* | 7/2018 | Migacz | ................ G06N 3/04 |
| 2018/0259645 A1* | 9/2018 | Shu | ................ G01S 7/497 |
| 2018/0299552 A1* | 10/2018 | Shu | ................ H10F 39/18 |
| 2019/0056497 A1* | 2/2019 | Pacala | ................ G01S 7/497 |
| 2019/0114786 A1* | 4/2019 | Sanghvi | ................ G06T 7/223 |
| 2020/0158835 A1 | 5/2020 | Yu | |
| 2020/0233066 A1 | 7/2020 | Kulesh et al. | |
| 2020/0233068 A1* | 7/2020 | Henderson | ............ H04N 25/773 |
| 2020/0236342 A1 | 7/2020 | Van Nieuwenhove et al. | |
| 2020/0278447 A1 | 9/2020 | Meinherz et al. | |
| 2020/0309909 A1 | 10/2020 | Zhang et al. | |
| 2022/0043128 A1* | 2/2022 | Pacala | ................ G01S 17/89 |
| 2023/0296739 A1* | 9/2023 | Aßmann | ................ G01S 17/10 356/3 |

FOREIGN PATENT DOCUMENTS

| | | |
|---|---|---|
| CN | 109143252 | 1/2019 |
| CN | 111413706 | 7/2020 |
| CN | 111935424 | 11/2020 |
| CN | 111965658 | 11/2020 |
| EP | 3370079 | 9/2018 |
| KR | 102010172 | 8/2019 |
| TW | 201946404 | 12/2019 |
| TW | 202002259 | 1/2020 |
| TW | 202024665 | 7/2020 |
| TW | I703341 | 9/2020 |

OTHER PUBLICATIONS

H. Seo et al., "A 36-Channel SPAD-Integrated Scanning LiDAR Sensor with Multi-Event Histogramming TDC and Embedded Interference Filter," 2020 IEEE Symposium on VLSI Circuits, Honolulu, HI, USA, 2020, pp. 1-2 (Year: 2020).*

"Office Action of Taiwan Counterpart Application", issued on Oct. 3, 2022, p. 1-p. 7.

"Office Action of Taiwan Related Application No. 110136143", issued on Jun. 27, 2022, pp. 1-7.

Sun; Ruizhi et al., "Single-Photon Detection Based on High Dynamic Range Time-To-Digital Converter", Journal of Jilin University (Information Science Edition), Jul. 2018, with English abstract, pp. 381-385, vol. 36, No. 4.

"Office Action of China Counterpart Application", issued on Sep. 1, 2023, p. 1-p. 6.

* cited by examiner

TIME-OF-FLIGHT RANGING DEVICE AND TIME-OF-FLIGHT RANGING METHOD

CROSS-REFERENCE TO RELATED APPLICATION

This application claims the priority benefit of U.S. provisional application Ser. No. 63/121,243, filed on Dec. 4, 2020, and China application serial no. 202111154878.7, filed on Sep. 29, 2021. The entirety of each of the above-mentioned patent applications is hereby incorporated by reference herein and made a part of this specification.

BACKGROUND

Technical Field

The disclosure relates to a ranging technology, and in particularly, relates to a time-of-flight ranging device and a time-of-flight ranging method.

Description of Related Art

At present, in the applications of direct time of flight (D-ToF) sensing, the integration time of a time-to-digital converter (TDC) determines the distance accuracy of a ranging device. In this regard, when the total measurement time is fixed, if the integration time decreases, the converted distance resolution increases, and the error of ranging may thus be lowered. As the integration time of the time-to-digital converter decreases, the number of bins in the histogram generated by the time-to-digital converter may increase. In this regard, an increase in the number of bins in the histogram may require increased storage space to store the results measured by the time-to-digital converter each time. As a result, the costs of the processing chip and the chip area of the distance measuring device may be considerably increased. However, if the integration time of the time-to-digital converter is increased in consideration of the costs of the processing chip of the ranging device, the distance resolution may drop and the error of measuring may increase. In particular, in the ranging process, when two objects approach each other, the ranging device may not be able to accurately distinguish the gap between the two objects.

SUMMARY

In view of the foregoing problems, the disclosure provides a time-of-flight ranging device and a time-of-flight ranging method capable of providing an accurate ranging function.

The disclosure provides a time-of-flight ranging device including a light source, a sensing array, and a time-to-digital converter. The light source is configured to emit a laser pulse signal towards a sensing target. The sensing array includes a plurality of sensing units and is configured to sense reflected pulse light generated when the sensing target reflects the laser pulse signal. The time-to-digital converter is coupled to the sensing array and is configured to perform an integration operation on a plurality of sensing results of the sensing units during a plurality of consecutive integration periods to generate histogram data. At least part of the integration periods have different time lengths, such that at least part of a plurality of bins in the histogram data have different bin widths.

The disclosure further provides a time-of-flight ranging method, and the method includes the following steps. A light source emits a laser pulse signal towards a sensing target. A plurality of sensing units of a sensing array sense reflected pulse light generated when the sensing target reflects the laser pulse signal. A time-to-digital converter performs an integration operation on a plurality of sensing results of the sensing units during a plurality of consecutive integration periods to generate histogram data. At least part of the integration periods have different time lengths, such that at least part of a plurality of bins in the histogram data have different bin widths.

To sum up, in the time-of-flight ranging device and the time-of-flight ranging method provided by the disclosure, the bin widths of part of the bins in the histogram data may be dynamically adjusted, such that part of the bins in the histogram data that are close to the actual sensing distance have narrow bin widths, and accurate sensing data may thus be provided.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the disclosure more comprehensible, several embodiments are described below as examples of implementation of the disclosure. Moreover, elements/components/steps with the same reference numerals are used to represent the same or similar parts in the drawings and embodiments.

Figure 1:
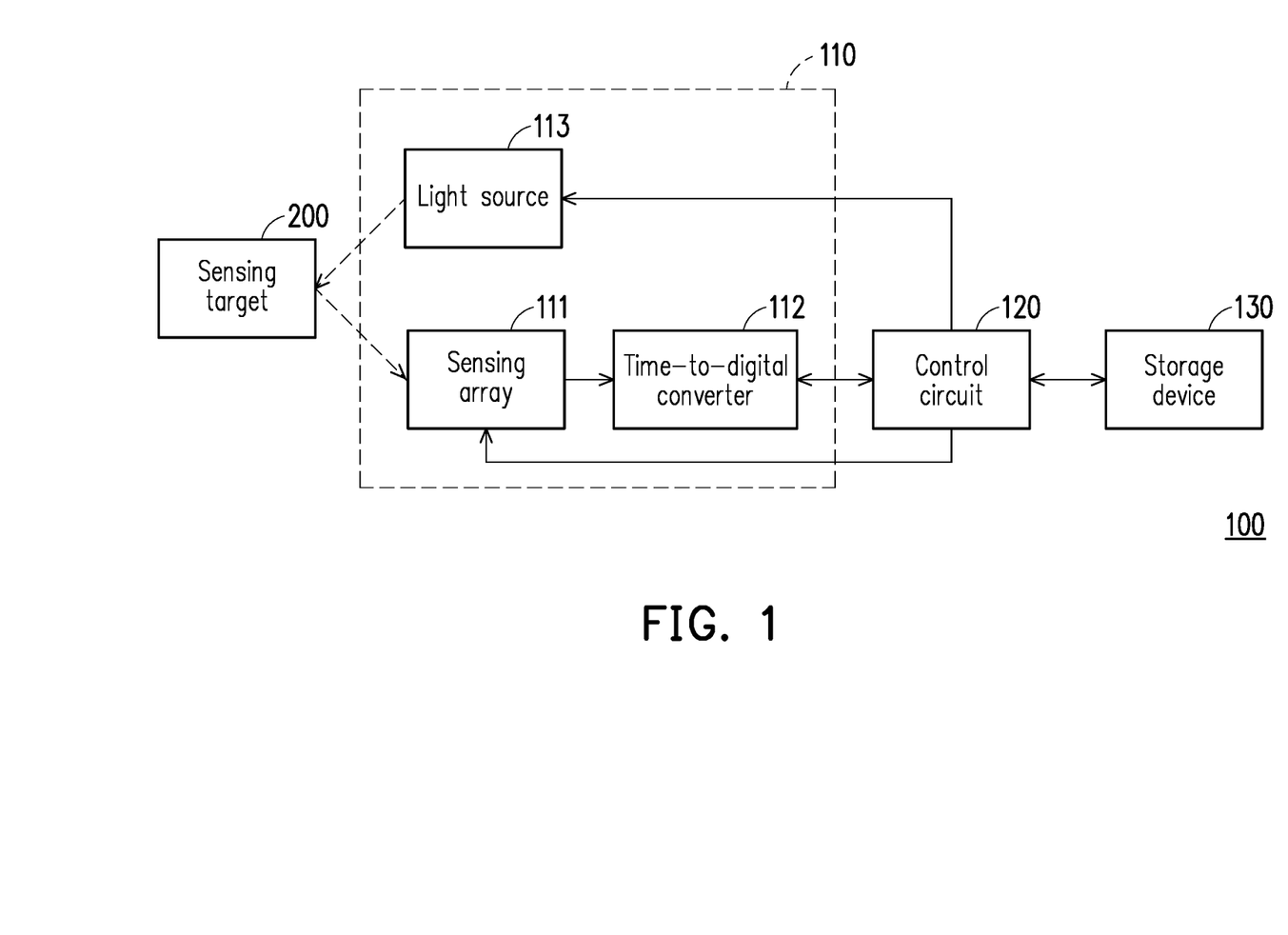
FIG. 1 is a schematic diagram of a time-of-flight ranging device according to an embodiment of the disclosure.

FIG. 1 is a schematic diagram of a time-of-flight ranging device according to an embodiment of the disclosure. With reference to FIG. 1, a time-of-flight ranging device 100 includes a time-of-flight sensor 110, a control circuit 120, and a storage device 130. The time-of-flight sensor 110 includes a sensing array 111, a time-to-digital converter (TDC) 112, and a light source 113. The control circuit 120 is coupled to the time-to-digital converter 112, the light source 113, and the storage device 130. The time-to-digital converter 112 is coupled to the sensing array 111. In this embodiment, the time-of-flight sensor 110 may perform a direct time of flight (D-ToF) sensing operation. The sensing array 111 may include a plurality of sensing units (sensing pixels) arranged in an array. In this embodiment, the sensing units may be a plurality of single photon avalanche diodes (SPADs). The light source 113 may be a laser light source and is configured to emit a laser pulse signal, and the laser pulse signal may be an infrared (IR) laser.

In this embodiment, the control circuit 120 may be configured to be a microcontroller unit (MCU) in the time-of-flight ranging device 100, but the disclosure is not limited thereto. In an embodiment, the control circuit 120 may be a central processing unit (CPU) of a terminal apparatus, and the time-of-flight ranging device 100 is disposed on the terminal apparatus. In this embodiment, the storage device 130 may be a memory disposed in the time-of-flight ranging device 100, but the disclosure is not limited thereto. In an embodiment, the storage device 130 may be a storage device of the terminal apparatus.

In this embodiment, the light source 113 may emit a laser pulse signal towards a sensing target 200. The laser pulse signal may be emitted to a surface of the sensing target 200 and reflects off the surface of the sensing target 200, and corresponding reflected pulse light is generated. The sensing units of the sensing array 111 may sense the reflected pulse light generated when the sensing target 200 reflects the laser pulse signal, and the sensing array 111 may output a plurality of sensing results of the sensing units to the time-to-digital converter 112. Based on the characteristics of the single photon avalanche diodes, each single photon avalanche diode may generate a sensing signal after receiving one or a few photons, and may store the sensing signal in a storage capacitor of the sensing unit. In this embodiment, the time-to-digital converter 112 may perform a plurality of times of integration operations on the sensing results of the single photon avalanche diodes during a plurality of consecutive integration periods to generate histogram data. The histogram data may be stored in a memory of the time-of-flight sensor 110 or a buffer of the time-to-digital converter 112. In this embodiment, the control circuit 120 may read out the histogram data and analyze the histogram data, so as to calculate a distance parameter between the time-of-flight ranging device 100 and the sensing target 200 according to the histogram data.

Figure 2:
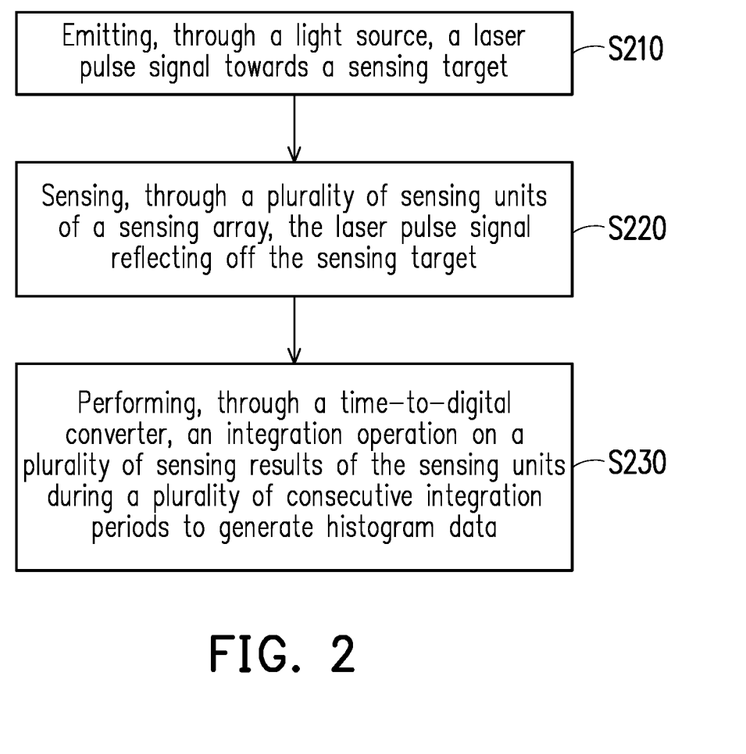
FIG. 2 is a flow chart of a time-of-flight ranging method according to a first embodiment of the disclosure.

FIG. 2 is a flow chart of a time-of-flight ranging method according to a first embodiment of the disclosure. With reference to FIG. 1 and FIG. 2, the time-of-flight ranging device 100 may execute steps S210 to S230 shown in FIG. 2 to implement a time-of-flight operation. In step S210, the time-of-flight ranging device 100 may emit a laser pulse signal towards the sensing target 200 through the light source 113. In step S220, the time-of-flight ranging device 100 may sense, through the sensing units of the sensing array 111, reflected pulse light generated when the sensing target 200 reflects the laser pulse signal. In step S230, the time-of-flight ranging device 100 may perform, through the time-to-digital converter 112, an integration operation on a plurality of sensing results of the sensing units during a plurality of consecutive integration periods to generate histogram data. Note that in this embodiment, at least part of the integration periods may have different time lengths, such that at least part of a plurality of bins in the histogram data have different bin widths.

Figure 3A:
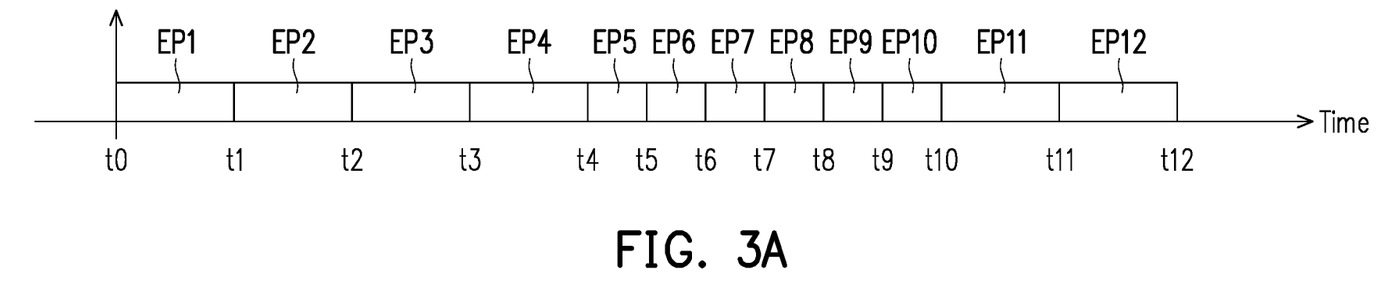
FIG. 3A is an integration timing diagram according to the first embodiment of the disclosure.
Figure 3B:
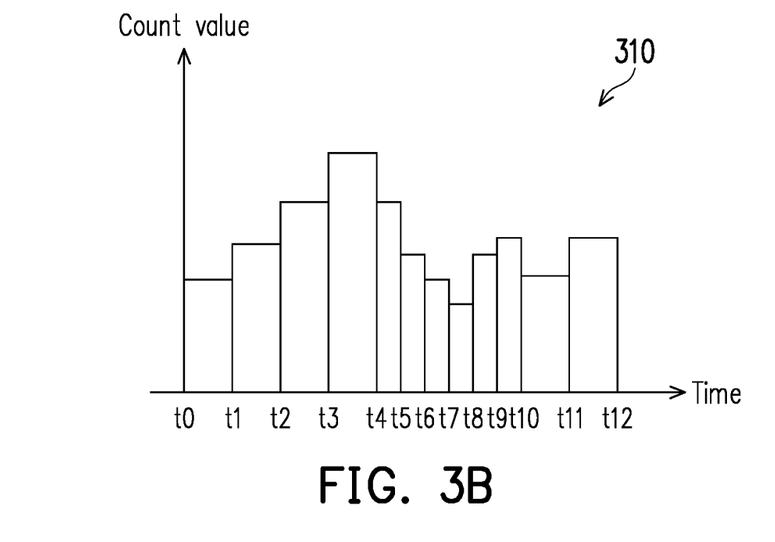
FIG. 3B is a schematic chart of histogram data according to the first embodiment of the disclosure.

With reference to FIG. 1, FIG. 3A, and FIG. 3B, FIG. 3A is an integration timing diagram according to the first embodiment of the disclosure, and FIG. 3B is a schematic chart of histogram data according to the first embodiment of the disclosure. For instance, as shown in FIG. 3A, when the sensing array 111 senses the reflected pulse light generated when the sensing target 200 reflects the laser pulse signal, the time-to-digital converter 112 may perform an integration operation on the sensing results of the sensing units during consecutive integration periods EP1 to EP12 between time t0 and time t12 to generate histogram data 310 as shown in FIG. 3B. In this embodiment, the integration periods EP5 to EP10 may have integration time lengths different from that of the integration periods EP1 to EP4, EP11, and EP12. For instance, the integration time lengths of the integration periods EP5 to EP10 may be shorter than the integration time lengths of the integration periods EP1 to EP4, EP11, and EP12. In other words, a time resolution between time t4 and time t10 may be greater than that of other time intervals.

The control circuit 120 may store the histogram data of FIG. 3B into the storage device 130 and may analyze the histogram data of FIG. 3B. As shown in FIG. 3B, the sensing results of the sensing units during the consecutive integration periods EP1 to EP12 may be presented as a plurality of bins of the histogram data 310 in FIG. 3B. Since the bin widths of the bins between time t4 and time t10 are narrow, the time resolution is high. In other words, if the time when the sensing array 111 receives the reflected pulse light is between time t4 and time t10, the time-of-flight ranging device 100 provided by this embodiment may obtain the sensing result of the distance parameter exhibiting high distance accuracy by analyzing the histogram data 310 in FIG. 3B.

In this embodiment, the control circuit 120 may determine the time when the sensing array 111 receives the reflected pulse light according to a plurality of count values corresponding to the bins of the histogram data 310 in FIG. 3B. Further, the control circuit 120 may calculate the distance parameter between the time-of-flight ranging device 100 and the sensing target 200 according to a time difference between emitting of the laser pulse signal (the emitting time is known) by the light source 113 and receiving of the reflected pulse light by the sensing array 111. In this embodiment, the sensing array 111 may also sense ambient light and thereby outputs a sensing result of the ambient light. Therefore, the control circuit 120 may determine whether the count values of consecutive bins among the bins in the histogram data 310 exceed a pre-designed count value and whether a number of the consecutive bins exceeds a predetermined number of consecutive bins. If yes is determined, the control circuit 120 may determine the time when the sensing array 111 receives the reflected pulse light through calculating the count values of the consecutive bins. For instance, the control circuit 120 may average the consecutive count values to obtain an average count value. Next, the control circuit 120 may calculate the time difference (td) between emitting of the laser pulse signal by the light source 113 and sensing of the reflected pulse light by the sensing array 111 according to the average count value and calculates the corresponding distance parameter, such as $D=td \times c$, according to the time difference, where D is the distance parameter, and c is the speed of light. Alternatively, in another embodiment, the control circuit 120 may determine a bin exceeding a threshold as a criterion for determination and analyze whether the distribution of adjacent multiple bins (front and rear adjacent bins) of this bin conform to the photon distribution of a reflector. If the distribution of the adjacent multiple bins of this bin conform to the photon distribution of the reflector, the control circuit 120 may determine the time when the sensing array 111 receives the reflected pulse light through calculating the count values of the consecutive bins. Alternatively, in still another embodiment, the control circuit 120 may also analyze multiple bins of the histogram data 310 in other ways to determine the time for reflecting the reflected pulse light, and the disclosure is not limited to the abovementioned embodiments.

Note that the integration time lengths of the integration periods EP1 to EP12 may be predetermined and are not limited to the time length distribution shown in FIG. 3A. In an embodiment, the integration time lengths of the integration periods EP1 to EP12 may include a plurality of time length designs and are not limited to the two designs shown in FIG. 3A. The integration time lengths of the integration periods EP1 to EP12 may also change gradually, for example, the time lengths may increase or decrease gradually. Furthermore, a number of integration periods is not limited to the number shown in FIG. 3A. In another embodiment, the control circuit 120 may dynamically adjust a plurality of time lengths of another plurality of integration periods in a next sensing operation according to the distance parameter which is obtained according to the analysis and calculating results of the histogram data 310 in FIG. 3B. In other words, as shown in FIG. 3B, when the control circuit 120 determines that the count value corresponding to the integration period EP4 is the highest, the control circuit 120 may adaptively adjust the integration time lengths of the integration period EP1 to EP12.

Figure 4A:
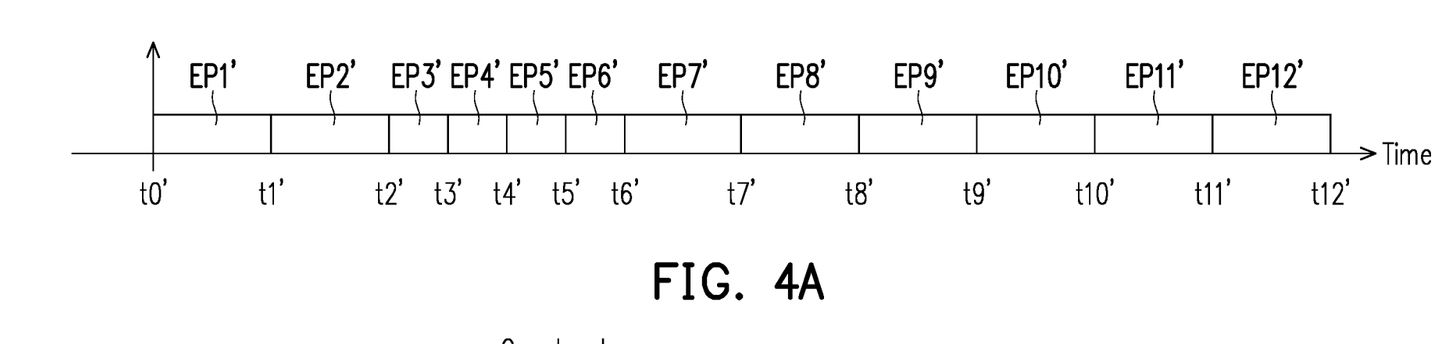
FIG. 4A is another integration timing diagram according to the first embodiment of the disclosure.
Figure 4B:
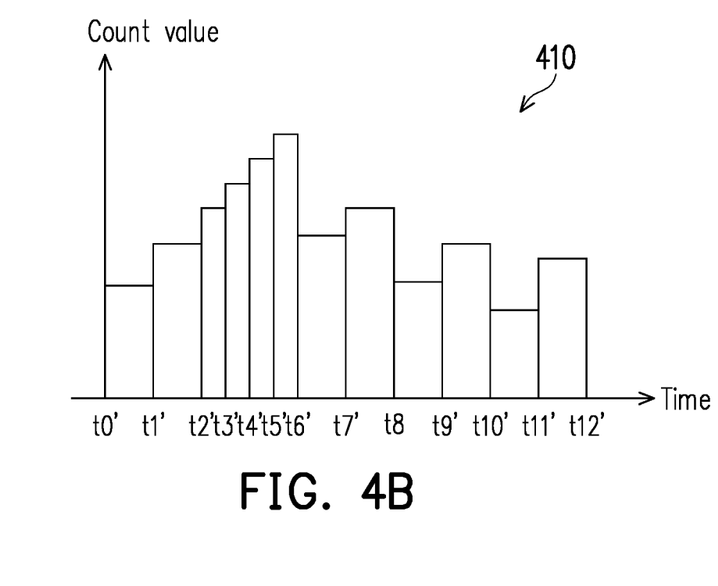
FIG. 4B is a schematic chart of another histogram data according to the first embodiment of the disclosure.

FIG. 4A is another integration timing diagram according to the first embodiment of the disclosure. FIG. 4B is a schematic chart of another histogram data according to the first embodiment of the disclosure. For instance, as shown in FIG. 1, FIG. 4A, and FIG. 4B, as described above, the control circuit 120 may decrease the integration periods close to the time when the sensing array 111 receives the reflected pulse light in the next sensing operation. Continuing from the description of FIG. 3A and FIG. 3B, in the next sensing operation, the control circuit 120 may shorten a time length of at least one (i.e., corresponding to at least one integration period adjacent to the one with the highest count value in previous sensing) of a plurality of integration periods EP1' to EP12' and increase time lengths of other integration periods. As shown in FIG. 4A, the control circuit 120 may shorten the time lengths of the integration periods EP3' to EP6' and increase the time lengths of other integration periods. During the next time the sensing array 111 senses the reflected pulse light generated when the sensing target 200 reflects the laser pulse signal, the time-to-digital converter 112 may perform an integration operation on the sensing results of the sensing units during the consecutive integration periods EP1' to EP12' between time t0' and time t12' to generate histogram data 410 as shown in FIG. 4B.

The control circuit 120 may store the histogram data 410 of FIG. 4B into the storage device 130 and may analyze the histogram data 410 of FIG. 4B. As shown in FIG. 4B, since the bin widths of the bins between time t2' and time t6' are narrow, the time resolution is high. In other words, if the time when the sensing array 111 receives the reflected pulse light is between time t2' and time t6', the time-of-flight ranging device 100 provided by this embodiment may obtain the sensing result of the distance parameter exhibiting high distance accuracy by analyzing the histogram data 410 in FIG. 4B. In other words, the time-of-flight ranging device 100 of this embodiment may adaptively adjust (dynamically adjust) the time lengths of at least part of the integration periods, and the sensing accuracy of the sensing results may thus be effectively improved.

Note that in this embodiment, after the time lengths of the integration periods EP1' to EP12' in the next sensing operation are adjusted, a sensing total time length corresponding to the integration periods EP1' to EP12' may remain unchanged. In other words, the sensing total time length corresponding to the integration periods EP1 to EP12 is identical to the sensing total time length corresponding to the integration periods EP1' to EP12', but the disclosure is not limited thereto. Further, after the time lengths of the integration periods EP1' to EP12' in the next sensing operation are adjusted, the number of integration periods of the integration periods EP1' to EP12' may remain unchanged. In other words, the number of integration periods of the integration periods EP1 to EP12 is identical to the number of integration periods of the integration periods EP1' to EP12', but the disclosure is not limited thereto. In other words, if the sensing total time length and the number of integration periods may remain unchanged, the histogram data 310 in FIG. 3B and the histogram data 410 in FIG. 4B may be stored in the storage device 130 and occupy a same storage space. In this way, in the time-of-flight ranging device 100 of this embodiment, a distance parameter exhibiting high distance accuracy may be obtained without an increase in the storage space.

Figure 5:
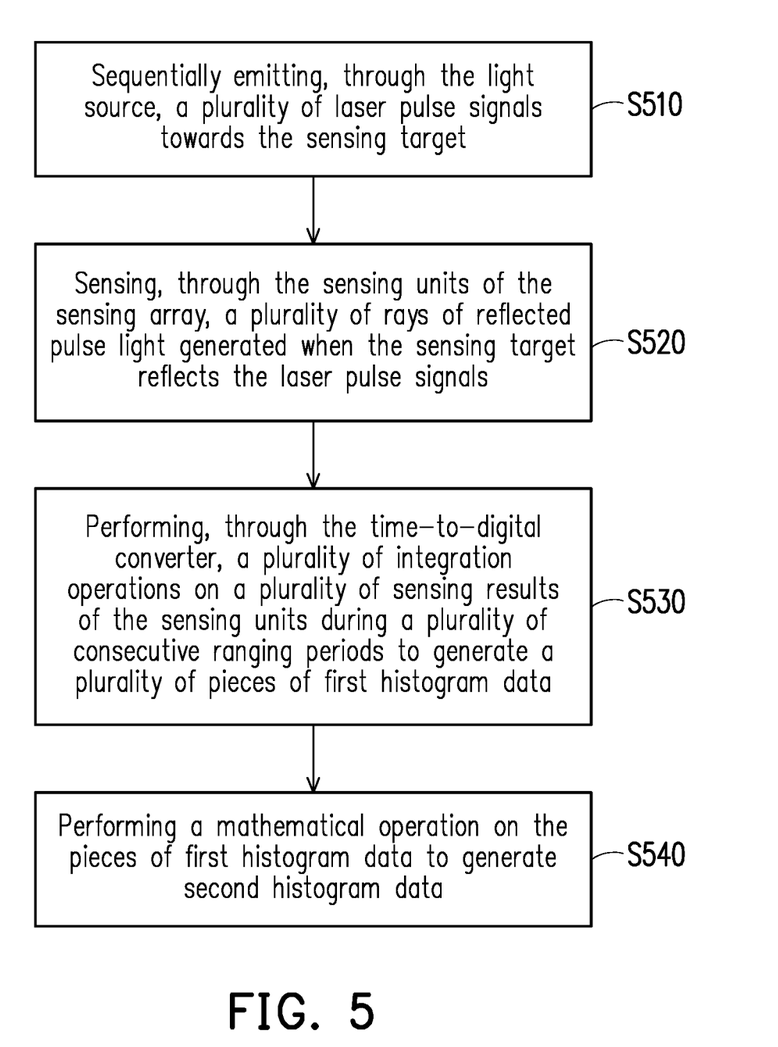
FIG. 5 is a flow chart of a time-of-flight ranging method according to a second embodiment of the disclosure.

FIG. 5 is a flow chart of a time-of-flight ranging method according to a second embodiment of the disclosure. With reference to FIG. 1 and FIG. 5, the time-of-flight ranging device 100 may execute steps S510 to S540 shown in FIG. 5 to implement a time-of-flight operation. In step S510, the time-of-flight ranging device 100, through the light source 113, may sequentially emit a plurality of laser pulse signals towards the sensing target 200. In this embodiment, the light source 113 may emit the laser pulse signals at a same time interval. In step S520, the time-of-flight ranging device 100 may sense, through the sensing units of the sensing array 111, a plurality of rays of reflected pulse light generated when the sensing target 200 reflects the laser pulse signals. In step S530, the time-of-flight ranging device 100 may perform, through the time-to-digital converter 112, a plurality of integration operations on a plurality of sensing results of the sensing units during a plurality of consecutive ranging periods to generate a plurality of pieces of first histogram data. In step S540, the time-of-flight ranging device 100 may perform a mathematical operation on the pieces of first histogram data to generate second histogram data. Note that the abovementioned mathematical operation may refer to methods such as an accumulation operation, an averaging operation, or a difference operation, for example, and the following embodiments in FIG. 6 and FIG. 7 are illustrated by way of an accumulation operation.

Note that the abovementioned ranging periods have a plurality of delay periods among one another, such that a plurality of periods of start time of the pieces of first histogram data are sequentially delayed by a plurality of time lengths. In addition, the time lengths of the delay periods are less than a plurality of bin widths of a plurality of bins in the pieces of first histogram data. In this way, each first number of bins in each of the first histogram data is less than a number of bins in the second histogram data, and a plurality of first bin widths in each piece of first histogram data are greater than a plurality of second bin widths in the second histogram data.

Figure 6:
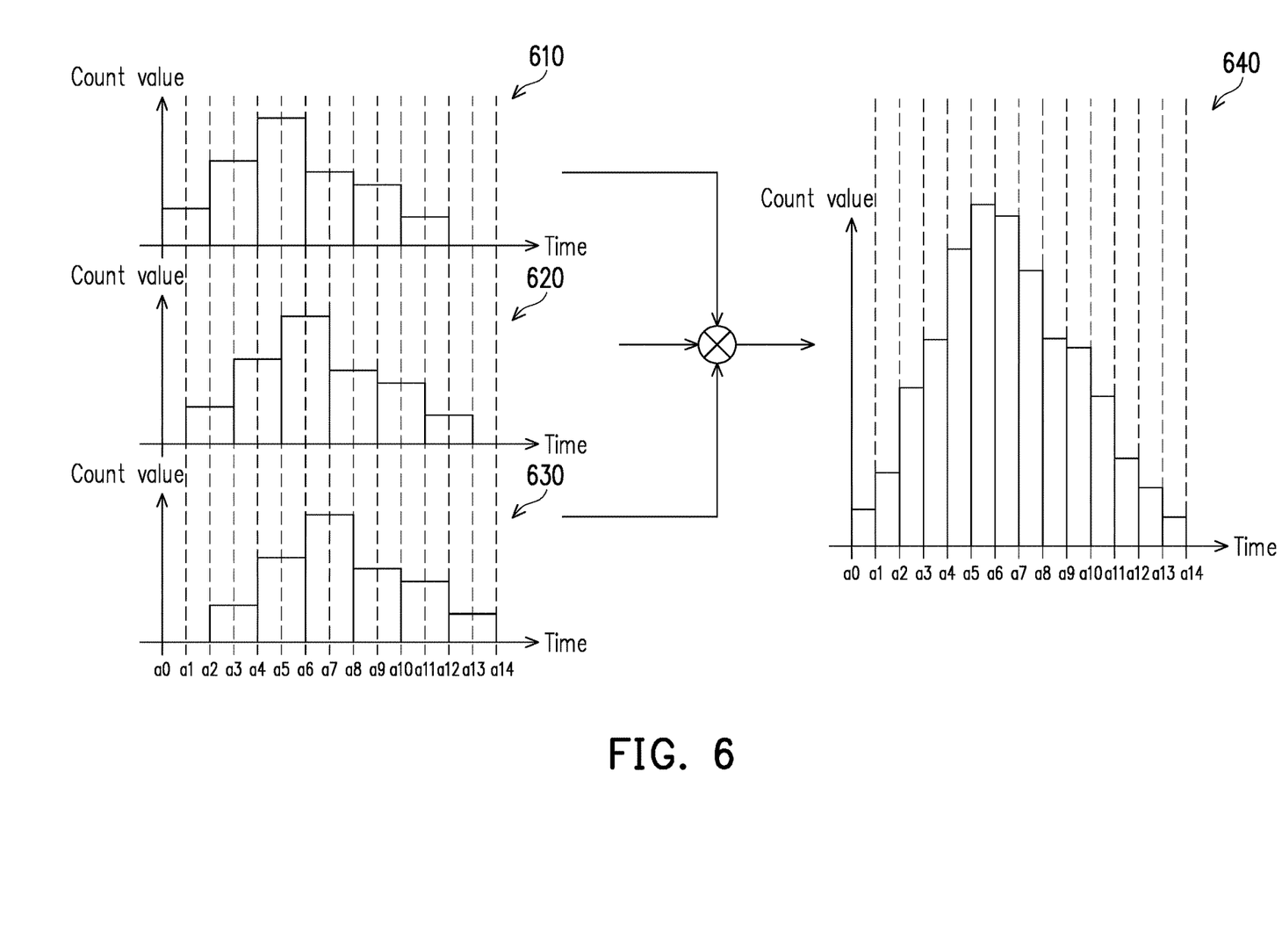
FIG. 6 is a schematic chart of histogram data according to the second embodiment of the disclosure.
Figure 7:
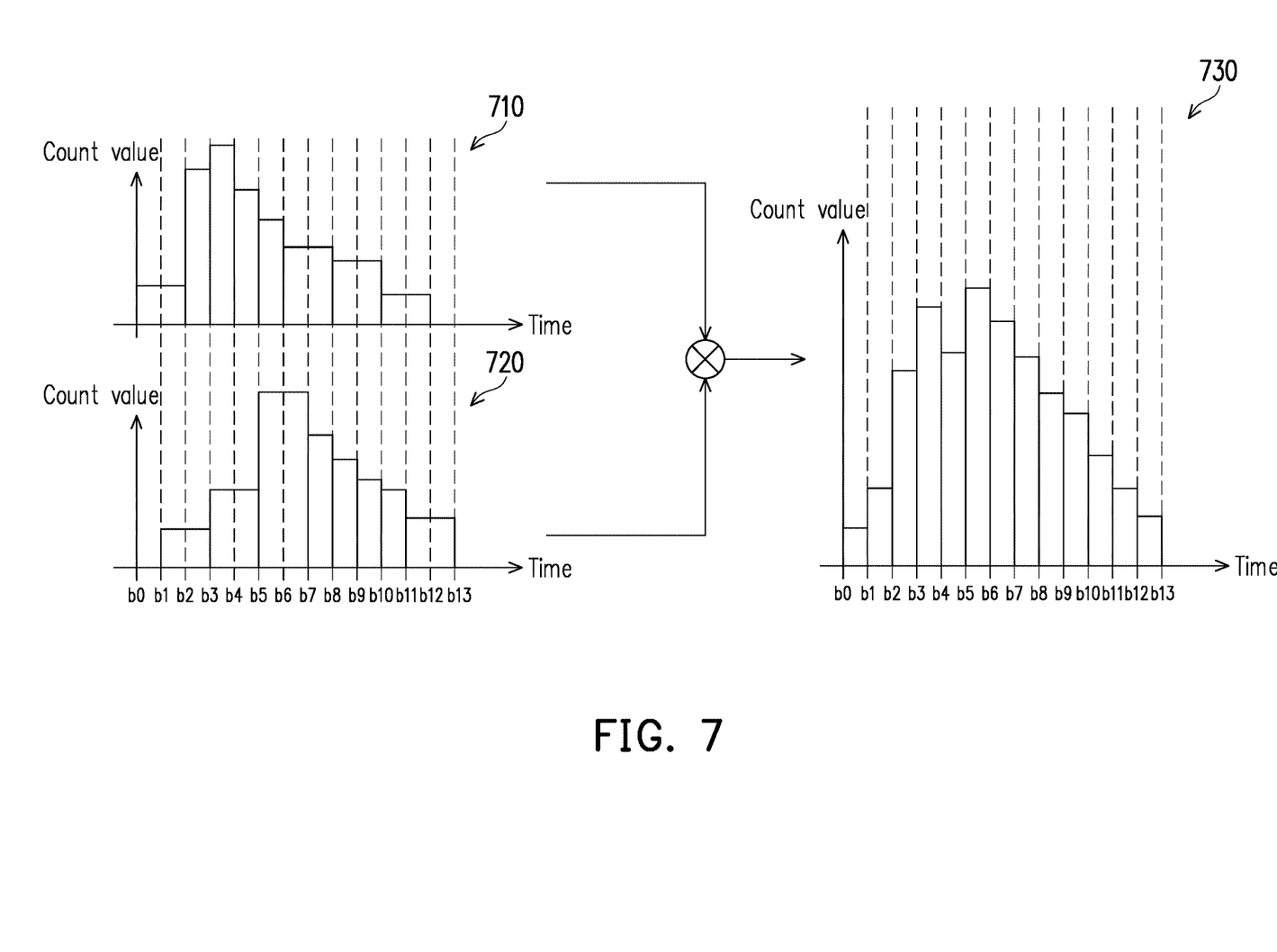
FIG. 7 is a schematic chart of histogram data according to a third embodiment of the disclosure.

With reference to FIG. 6, FIG. 6 is a schematic chart of histogram data according to the second embodiment of the disclosure. For instance, the time-to-digital converter 112 may perform a plurality of integration operations on a plurality of sensing results of the sensing units of the sensing array 111 during three consecutive ranging periods (without overlapping) to generate three pieces of first histogram data 610 to 630 as shown in FIG. 6, where time a0 to time a14 are configured to represent timing relationships of relative time of the first histogram data 610 to 630 during different ranging periods. In this example, the three consecutive ranging periods are individually synchronized with the time when the light source 113 sequentially emits three laser pulse signals towards the sensing target 200. During a first ranging period, the first histogram data 610 generated by the time-to-digital converter 112 may have six bins between time a0 and time a12. During a second ranging period, the first histogram data 620 generated by the time-to-digital converter 112 may have six bins between time a1 and time a13. During a third ranging period, the first histogram data 630 generated by the time-to-digital converter 112 may have six bins between time a2 and time a14. The time lengths of the integration periods of the first ranging period are identical, such that the bin widths of the bins in the first histogram data 610 to 630 are identical (e.g., a time length t, the time length from time a0 to time a2, for example). A delay period having a time length of t/2 (e.g., the time length from time a0 to time a1) may be provided between the first ranging period and the second ranging period, and a delay period having a time length of t/2 (e.g., the time length from time a1 to time a2) may be provided between the second ranging period and the third ranging period.

In this example, the control circuit 120 may accumulate the first histogram data 610 to 630 to generate second histogram data 640, and the second histogram data 640 may have twelve bins between time a0 and time a14. In other words, each number of bins in each of the first histogram data 610 to 630 is less than the number of bins in the second histogram data 640, and the bin widths in each of the first histogram data 610 to 630 are greater than the bin widths in the second histogram data 640. Therefore, compared to the first histogram data 610 to 630, the control circuit 120 may calculate the sensing result of the distance parameter with high distance accuracy between the time-of-flight ranging device 100 and the sensing target 200 according to the second histogram data 640. As shown in FIG. 6, the control circuit 120 may, through the second histogram data 640, determine the highest count value between time a5 and time a6, and further calculates the distance parameter. Compared to the first histogram data 610, the control circuit 120 may determine the highest count value between time a4 and time a6 only through the first histogram data 610.

From another perspective, if the time lengths of a plurality of identical delay periods are t/M, the time resolution of the second histogram data may be increased by approximately M times, such that the distance accuracy of the distance parameter calculated through the second histogram data may also be increased by approximately M times. Nevertheless, the time lengths of the delay periods are not limited to the description provided above in the disclosure. In an embodiment, the time lengths of the delay periods may also increase proportionally or increase non-proportionally.

FIG. 7 is a schematic chart of histogram data according to a third embodiment of the disclosure. With reference to FIG. 1 and FIG. 7, the time-to-digital converter 112 may perform a plurality of integration operations on a plurality of sensing results of the sensing units of the sensing array 111 during two consecutive ranging periods (without overlapping) to generate two pieces of third histogram data 710 to 720 as shown in FIG. 7, where time b0 to time b13 are configured to represent the timing relationships of the relative time of the third histogram data 710 to 720 during different ranging periods. In this example, the two consecutive ranging periods are individually synchronized with the time when the light source 113 sequentially emits two laser pulse signals towards the sensing target 200. During a ranging period, the third histogram data 710 generated by the time-to-digital converter 112 may have eight bins between time b0 and time b12. During a next ranging period, the third histogram data 720 generated by the time-to-digital converter 112 may have eight bins between time b1 and time b13.

Note that in this embodiment, at least part of the consecutive integration periods of each of the integration operations may have different time lengths, such that at least part of a plurality of bins in each of the third histogram data 710 and 720 have different bin widths. As shown in FIG. 7, in the third histogram data 710, the bin widths from time b0 to time b2, from time b6 to time b8, from time b8 to time b10, and from time b10 to time b12 may be a time length t', and in the third histogram data 710, the bin widths from time b2 to time b3, from time b3 to time b4, from time b4 to time b5, and from time b5 to time b6 may be a time length t'/2. In the third histogram data 720, the bin widths from time b1 to time b3, from time b3 to time b5, from time b5 to time b7, and from time b11 to time b13 may be the time length t', and in the third histogram data 720, the bin widths from time b7 to time b8, from time b8 to time b9, from time b9 to time b10, and from time b10 to time b11 may be the time length t'/2. Further, a delay period having the time length t' (e.g., the time length from time b0 to time b1) may be provided between two ranging periods. Note that in an embodiment, a delay period may not be provided between two ranging periods (that is, t'=0).

In this embodiment, the control circuit 120 may accumulate the third histogram data 710 and 720 to generate fourth histogram data 730, the fourth histogram data 730 may have thirteen bins between time b0 and time b13, and each bin in the fourth histogram data 730 may have a bin width of the time length t'/2. As shown in FIG. 7, the number of bins in the fourth histogram data 730 is greater than each number of bins in the third histogram data 710 and 720, and overall time accuracy of the fourth histogram data 730 is greater than each overall time accuracy of the third histogram data 710 and 720. Therefore, compared to the third histogram data 710 and 720, the control circuit 120 may calculate the sensing result of the distance parameter with high distance accuracy between the time-of-flight ranging device 100 and the sensing target 200 according to the fourth histogram data 730.

Note that this embodiment may be applied to the abovementioned first embodiment. For instance, a delay period may be provided or may not be provided between the two ranging periods in FIG. 3B and FIG. 4B. The control circuit 120 may accumulate the histogram data 310 and 410 of FIG. 3B and FIG. 4B to obtain histogram data exhibiting good overall time accuracy. Besides, this embodiment may also be applied to the abovementioned second embodiment. For instance, at least part of the bins in each of the histogram data 610 to 630 may have different bin widths, and therefore, the control circuit 120 may accumulate the histogram data 610 to 630 having different bin widths to obtain histogram data exhibiting good overall time accuracy.

In view of the foregoing, in the time-of-flight ranging device and the time-of-flight ranging method provided by the disclosure, through the time-to-digital converter, the time lengths of the integration periods during one ranging period may be dynamically adjusted, and/or an mathematical operation may be performed on the ranging periods in which the start time of each other's integration period is provided with a delay period, such that histogram data exhibiting good overall time accuracy may be obtained. In other words, in the time-of-flight ranging device and the time-of-flight ranging method provided by the disclosure, histogram data exhibiting good overall time accuracy may be obtained without an increase in the storage space and/or without a change in the sensing total time length, and therefore, a distance parameter exhibiting good distance accuracy may be further calculated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A time-of-flight ranging device, comprising:
   a light source, configured to emit a laser pulse signal towards a sensing target;
   a sensing array, comprising a plurality of sensing units, sensing reflected pulse light generated when the sensing target reflects the laser pulse signal;
   a time-to-digital converter, coupled to the sensing array, performing an integration operation on a plurality of sensing results of the sensing units during a plurality of consecutive integration periods to generate histogram data; and
   a control circuit, coupled to the light source, the sensing array, and the time-to-digital converter, configured to calculate a distance parameter between the time-of-flight ranging device and the sensing target according to the histogram data,
   wherein at least part of the integration periods have different time lengths, such that at least part of a plurality of bins in the histogram data have different bin widths,
   wherein the control circuit determines whether count values of consecutive bins among the bins in the histogram data exceed a pre-designed count value and whether a number of the consecutive bins exceeds a predetermined number of consecutive bins to calculate time when the sensing array receives the reflected pulse light,
   wherein the control circuit dynamically adjusts a plurality of time lengths of another plurality of integration periods in a next sensing operation according to the time when the sensing array receives the reflected pulse light.

2. The time-of-flight ranging device according to claim 1, wherein the control circuit determines a time difference between emitting of the laser pulse signal by the light source and receiving of the reflected pulse light by the sensing array according to a plurality of count values corresponding to the bins of the histogram data.

3. The time-of-flight ranging device according to claim 1, wherein the control circuit decreases at least one of the another plurality of integration periods close to the time when the sensing array receives the reflected pulse light in the next sensing operation, and the control circuit increases the time length of at least another one of the another plurality of integration periods.

4. The time-of-flight ranging device according to claim 1, wherein after the time lengths of the another plurality of integration periods in the next sensing operation are adjusted, a sensing total time length corresponding to the another plurality of integration periods remains unchanged.

5. The time-of-flight ranging device according to claim 1, wherein after the time lengths of the another plurality of integration periods in the next sensing operation are adjusted, a number of integration periods of the another plurality of integration periods remains unchanged.

6. The time-of-flight ranging device according to claim 1, further comprising:
   a storage device, coupled to the control circuit,
   wherein the time-to-digital converter performs an integration operation on another plurality of sensing results of the sensing units during the another plurality of consecutive integration periods in the next sensing operation to generate another histogram data,
   wherein the histogram data and the another histogram data occupy a same storage space in the storage device.

7. The time-of-flight ranging device according to claim 1, wherein the sensing units are a plurality of single photon avalanche diodes.

8. A time-of-flight ranging method, comprising:
   emitting, through a light source, a laser pulse signal towards a sensing target;
   sensing, through a plurality of sensing units of a sensing array, reflected pulse light generated when the sensing target reflects the laser pulse signal;
   performing, through a time-to-digital converter, an integration operation on a plurality of sensing results of the sensing units during a plurality of consecutive integration periods to generate histogram data;
   calculating, through a control circuit, a distance parameter between a time-of-flight ranging device and the sensing target according to the histogram data,
   wherein at least part of the integration periods have different time lengths, such that at least part of a plurality of bins in the histogram data have different bin widths;
   determining, through the control circuit, whether count values of consecutive bins among the bins in the histogram data exceed a pre-designed count value and whether a number of the consecutive bins exceeds a predetermined number of consecutive bins to calculate time when the sensing array receives the reflected pulse light; and
   dynamically adjusting, through the control circuit, a plurality of time lengths of another plurality of integration periods in a next sensing operation according to the time when the sensing array receives the reflected pulse light.

9. The time-of-flight ranging method according to claim 8, wherein the step of calculating the distance parameter further comprises:
   determining a time difference between emitting of the laser pulse signal by the light source and receiving of the reflected pulse light by the sensing array according to a plurality of count values corresponding to the bins of the histogram data.

10. The time-of-flight ranging method according to claim 8, wherein the step of dynamically adjusting the time lengths further comprises:
    decreasing at least one of the another plurality of integration periods close to the time when the sensing array receives the reflected pulse light in the next sensing operation; and
    increasing the time length of at least another one of the another plurality of integration periods.

11. The time-of-flight ranging method according to claim 8, wherein after the time lengths of the another plurality of integration periods in the next sensing operation are adjusted, a sensing total time length corresponding to the another plurality of integration periods remains unchanged.

12. The time-of-flight ranging method according to claim 8, wherein after the time lengths of the another plurality of integration periods in the next sensing operation are adjusted, a number of integration periods of the another plurality of integration periods remains unchanged.

13. The time-of-flight ranging method according to claim 8, wherein the step of dynamically adjusting the time lengths further comprises:
   performing, through the time-to-digital converter, an integration operation on another plurality of sensing results of the sensing units during the another plurality of consecutive integration periods in the next sensing operation to generate another histogram data,
   wherein the histogram data and the another histogram data occupy a same storage space in the storage device.

14. The time-of-flight ranging method according to claim 8, wherein the sensing units are a plurality of single photon avalanche diodes.

* * * * *